United States Patent

Temple

[11] 4,339,774
[45] Jul. 13, 1982

[54] APPARATUS AND METHOD FOR GENERATING A DISPERSED DOT HALF TONE PICTURE FROM A CONTINUOUS TONE PICTURE

[75] Inventor: Stephen Temple, Cambridge, England

[73] Assignee: Cambridge Consultants Limited, Cambridge, England

[21] Appl. No.: 218,302

[22] Filed: Dec. 19, 1980

[30] Foreign Application Priority Data

Dec. 20, 1979 [GB] United Kingdom ................ 7943894

[51] Int. Cl.$^3$ .............................................. H04N 1/40
[52] U.S. Cl. .................................. 358/283; 358/903; 364/515
[58] Field of Search ...................... 358/283, 280, 903; 364/515

[56] References Cited
U.S. PATENT DOCUMENTS 4,210,936 7/1980 Cinque ................................ 358/283
4,258,393 3/1981 Ejiri ..................................... 358/283

*Primary Examiner*—Howard Britton
*Attorney, Agent, or Firm*—Curtis, Morris & Safford

[57] ABSTRACT

Apparatus and method for generating a dispersed dot half tone picture from a continuous tone picture involves the making of a thresholding decision at each picture element to decide whether or not a dot is printed in the output picture and is characterized in that cumulative weighted sums of the errors between the original continuous tone picture and the output half tone picture at each picture element are held for each column of the picture matrix and from these column sums of errors a sector sum of errors is formed and used in the thresholding decision. The column and sector sums of errors are up-dated by simple recursive relationships. Edge enhancement is introduced in a simple manner obviating the need to calculate a local greyscale average. Distracting patterns of dots in the output picture are broken up by the use of carefully selected threshold values.

17 Claims, 10 Drawing Figures

| 0 | 1 | 2 | 1 | 2 | 1 | 0 | 1 | 1 |
|---|---|---|---|---|---|---|---|---|
| 1 | 0 | 1 | 1 | 1 | 0 | 1 | 1 | 2 |
| 1 | 6 | 0 | 1 | 0 | 6 | 1 | 1 | 3 |
| 1 | 1 | 1 | 0 | 1 | 1 | 1 | 1 | 4 |
| 1 | 6 | 0 | 1 | 0 | 6 | 1 | 1 | 3 |
| 1 | 0 | 1 | 1 | 1 | 0 | 1 | 1 | 2 |
| 0 | 1 | 2 | 1 | 2 | 1 | 0 | 1 | 1 |
| 1 | 1 | 1 | 1 | 1 | 1 | 1 | 0 | 0 |
| 1 | 2 | 3 | 4 | 3 | 2 | 1 | 0 | CYCLES PER 8×8 MATRIX |

FIG. 7A — AMPLITUDES OF SPATIAL FREQUENCIES

| $\frac{3}{16}$ | $-\frac{5}{16}$ | $0$ | $\frac{1}{4}$ | $\frac{1}{16}$ | $-\frac{5}{16}$ | $-\frac{3}{16}$ | $\frac{3}{8}$ |
|---|---|---|---|---|---|---|---|
| $0$ | $\frac{3}{16}$ | $\frac{3}{16}$ | $-\frac{1}{8}$ | $\frac{1}{8}$ | $\frac{3}{16}$ | $\frac{1}{16}$ | $-\frac{1}{4}$ |
| $\frac{1}{16}$ | $-\frac{1}{16}$ | $0$ | $0$ | $-\frac{1}{8}$ | $0$ | $0$ | $0$ |
| $\frac{1}{16}$ | $-\frac{5}{16}$ | $-\frac{1}{4}$ | $\frac{3}{8}$ | $\frac{1}{16}$ | $-\frac{3}{8}$ | $-\frac{1}{4}$ | $\frac{1}{16}$ |
| $\frac{1}{16}$ | $\frac{1}{4}$ | $\frac{1}{8}$ | $-\frac{3}{8}$ | $-\frac{1}{16}$ | $\frac{1}{4}$ | $\frac{1}{16}$ | $-\frac{1}{2}$ |
| $\frac{1}{8}$ | $-\frac{1}{8}$ | $-\frac{1}{16}$ | $-\frac{5}{16}$ | $\frac{1}{4}$ | $-\frac{3}{8}$ | $0$ | $\frac{1}{4}$ |
| $0$ | $\frac{1}{16}$ | $-\frac{1}{16}$ | $-\frac{1}{8}$ | $0$ | $0$ | $-\frac{1}{8}$ | $-\frac{1}{8}$ |
| $-\frac{1}{8}$ | $\frac{5}{16}$ | $\frac{1}{16}$ | $-\frac{1}{8}$ | $\frac{1}{16}$ | $\frac{1}{4}$ | $\frac{1}{16}$ | $\frac{3}{16}$ |

FIG. 7B — THRESHOLD AMPLITUDES

APPARATUS AND METHOD FOR GENERATING A DISPERSED DOT HALF TONE PICTURE FROM A CONTINUOUS TONE PICTURE

The present invention relates to the generation of dispersed dot half tone pictures from a continuous tone picture.

The printed reproduction of continuous tone pictures is conventionally carried out using half tone printing screens or plates such that the half tone dots at a fixed screen pitch or resolution each have an optical density after printing equal to the local optical density of the original picture. The printing screens or plates are generated photographically or are generated using a scanner and computer processor which simulates the photographic screen production.

Matrix printers and displays have now been developed as a flexible means of displaying computer generated graphics and alpha numerics, whose output format is a square or rectangular binary—that is to say bilevel—matrix of fixed sized black or white dots, that can be driven by digital data in a one bit per point format. When used to reproduce continuous tone pictures, the black or white fixed-weight dots are dispersed in the binary matrix so that the local dot density matches the tone of the original picture. Half tone reproduction of this type differs from conventional printing half tones in that it employs fixed sized dots at a variable spacial density in place of varying size dots at fixed positions, and in that the screens or plates cannot be generated photographically but are particularly suitable for generation using a computer processor. The dispersed dot type of half tone reproduction lends itself particularly well to digital facsimile transmission since each picture element is represented in the matrix by a print value having either of the two levels of "print" or "not print," rather than one of —say—sixty four greyscale values.

Accordingly, this invention relates in particular to apparatus for generating a dispersed dot half tone picture from a continuous tone picture comprising means for formulating a greyscale matrix of picture element greyscale values representative of the continuous tone picture; processing means serving to produce through sequential processing of the picture elements along successive lines of the matrix an identically dimensioned binary matrix of picture element binary print values and output means providing a dispersed dot half tone picture by assigning fixed size print dots to the picture elements in accordance with the respective binary print values.

This invention also relates to a method for generating a dispersed dot half tone picture from a continuous tone picture comprising the steps of formulating a greyscale matrix of picture element greyscale values representative of the continuous tone picture, processing the picture elements sequentially along successive lines of the matrix to produce an identically dimensioned binary matrix of picture element binary print values and forming a dispersed dot half tone picture by assigning fixed size print dots to the picture elements in accordance with the respective binary print values.

Dispersed dot half tone pictures have been generated by various methods for some years with mixed results. Attention is drawn in this regard to the disclosure of the following publications:

(i) "An adaptive algorithm for spatial greyscale." FLOYD and STEINBERG; Proceedings of the Society for Information Display Volume 17/2 Second Quarter 1976; Pages 75 to 77.

(ii) "A survey of techniques for the display of continuous tone pictures on bilevel displays" JARVIS, JUDICE and NINKE; Computer Graphics and Image Processing Volume 5 1976; Pages 13 to 40.

(iii) "Bilevel image displays—a new approach" PRYOR, CINQUE and RUBENSTEIN; Proceedings of the Society for Information Display Volume 19/3 Third Quarter 1978; Pages 127 to 131.

(iv) "Half tone method with edge enhancement and Moire suppression" ROETLING; Journal of the Optical Society of America Volume 66 No. 10. October 1976; Pages 985 to 989.

One general approach described in the above cited references is to use a thresholding decision on each picture element with a threshold value which is in some cases determined solely by the coordinates of the picture element being processed (one such method being referred to in the art as "ordered dither") and which in other cases is influenced by the decisions already made at neighbouring picture elements (examples being the methods known as "constrained average" and "dynamicthreshold"). The ordered dither approach has the merit of straightforward processing but is prone, particularly in areas of uniform greyscale, to introduce patterns not present in the original continuous tone picture and distracting to the eye. The other methods mentioned involve significantly more complex processing and have still—to-date—not been able to deal with the problem of contouring, or distracting artefacts of the distribution of dots in the output half tone picture, which are not present in the original continuous tone picture.

A second approach, described for example in the FLOYD and STEINBERG paper and at pages 36 to 38 of the paper by JARVIS, JUDICE and NINKE, can be referred to as "error diffusion." Here a thresholding decision is made at each picture element influenced by an error being diffused to or from neighbouring picture elements. In particular, the prior art shows an error weighting matrix which governs the position of neighbouring picture elements to or from which error is to be distributed and also the ratios in which the error is distributed amoungst those elements.

The main disadvantage of these prior methods of error diffusion is that the necessary processing is complicated. Thus, it is explained in the paper by JARVIS, JUDICE and NINKE that with the error diffusion matrix that is there suggested—and it is thought that this is the minimum sized matrix that can be employed if satisfactory results are to be achieved—three line memories are required to contain successive error values and a substantial number of computations are needed at each picture element. In essence it is necessary at each picture element, before a thresholding decision can be made, to extract from memory and sum the errors from neighbouring print elements covered by the error matrix, the contribution of each element in this error sum being weighted by the appropriate term in the matrix.

In most prior methods of generating dispersed dot half tone pictures, including those mentioned above, there is an effective loss in edge detail such that, if satisfactory picture quality is to be retained, a form of edge enhancement is most desirable. Some approaches do not admit of edge enhancement at all and in the others the employment of edge enhancement adds considerably to the complexity of the processing. Usually, it has been necessary—in addition to the functions of making threshold decisions and diffusing error—to calculate a local greyscale average from which fluctuations in greyscale can be measured and enhanced.

It is one object of this invention to provide apparatus and methods for generating dot half tone picture from a continuous tone picture which are less complex than those employed hitherto and which are capable of producing half tone pictures with minimal eye distracting artefacts.

Accordingly, apparatus according to the present invention is characterised in that the processing means comprises column summing means for maintaining and updating for each matrix column a cumulative weighted sum of errors between the greyscale and binary values at picture elements already processed in that column, said errors being weighted in accordance with the proximity of the associated picture element of the line containing the picture element being processed; sector summing means for providing at the picture element being processed a cumulative weighted sum of column sums with each column sum in the sector sum being weighted in accordance with the proximity of the associated column to the column containing the picture element being processed and threshold means for comparing the sum of the greyscale value at the picture element being processed and said sector sum of errors with a threshold value to determine the associated print value in the binary matrix.

Advantageously, the column summing means and the sector summing means are adapted to provide the respective weighted column sums and weighted sector sum by means of recursive relationships.

Preferably, the column summing means is so adapted that each column sum is weighted in the sector sum by a factor whose exponent is proportional to the distance between that column and the column containing the picture element being processed.

In one form of the invention the column summing means includes means for generating a first correction term, being a multiple of the greyscale value, for use in calculating said cumulative weighted column sum and in that the threshold means includes means for generating a second correction term, being a multiple of the greyscale value, for use in determining the associated print value.

A method according to this invention is characterised in that the processing step comprises comparing at each picture element a sector sum of errors between the greyscale and binary values at picture elements already processed plus the greyscale value at that picture element, with a threshold value to determine the corresponding print value in the binary matrix; using the resulting error to update in a recursive manner a cumulative weighted column sum of errors between the greyscale and binary values over picture elements already processed in the column containing that picture element and producing in a recursive manner a new weighted sector sum from the cumulative weighted column sums.

In a preferred form of this aspect of the inventin, in the comparison step a term is added to the greyscale value corresponding to the product of a detail enhancement factor and said greyscale value and the updating of the associated column sum includes the subtraction of a term corresponding to the product of the detail enhacement factor appropriately weighted and said greyscale value, said weighting of the detail enhancement factor being such that in picture areas of uniform greyscale value said terms cancel and that a fluctuation from a uniform greyscale value is enhanced in said comparison by the detail enhancement factor.

It will be appreciated that in one form of the apparatus and method according to this invention, the processing of each picture element involves only a single thresholding decision and the updating in a simple recursive relationship of the trailing sector sum, the appropriate column sum and the appropriate leading sector sum. This can be contrasted with the steps in the method described in the paper of JARVIS, JUDICE and NINKE; these being, forming the products between twelve separate error values and the respective weighting factor in the error matrix, summing these products, making a thresholding decision and updating the error values. Clearly, if an attempt is made to improve the picture quality given by this prior art method by increasing the size of the error matrix, the number of computations and the number of lines of error values requiring to be stored, will increase accordingly.

This invention will now be described by way of example with reference to the accompanying figures in which:

FIGS. 7a and 7b show in tabular form the amplitudes of the spacial frequencies of a threshold matrix and the equivalent matrix amplitudes.

Figure 1:
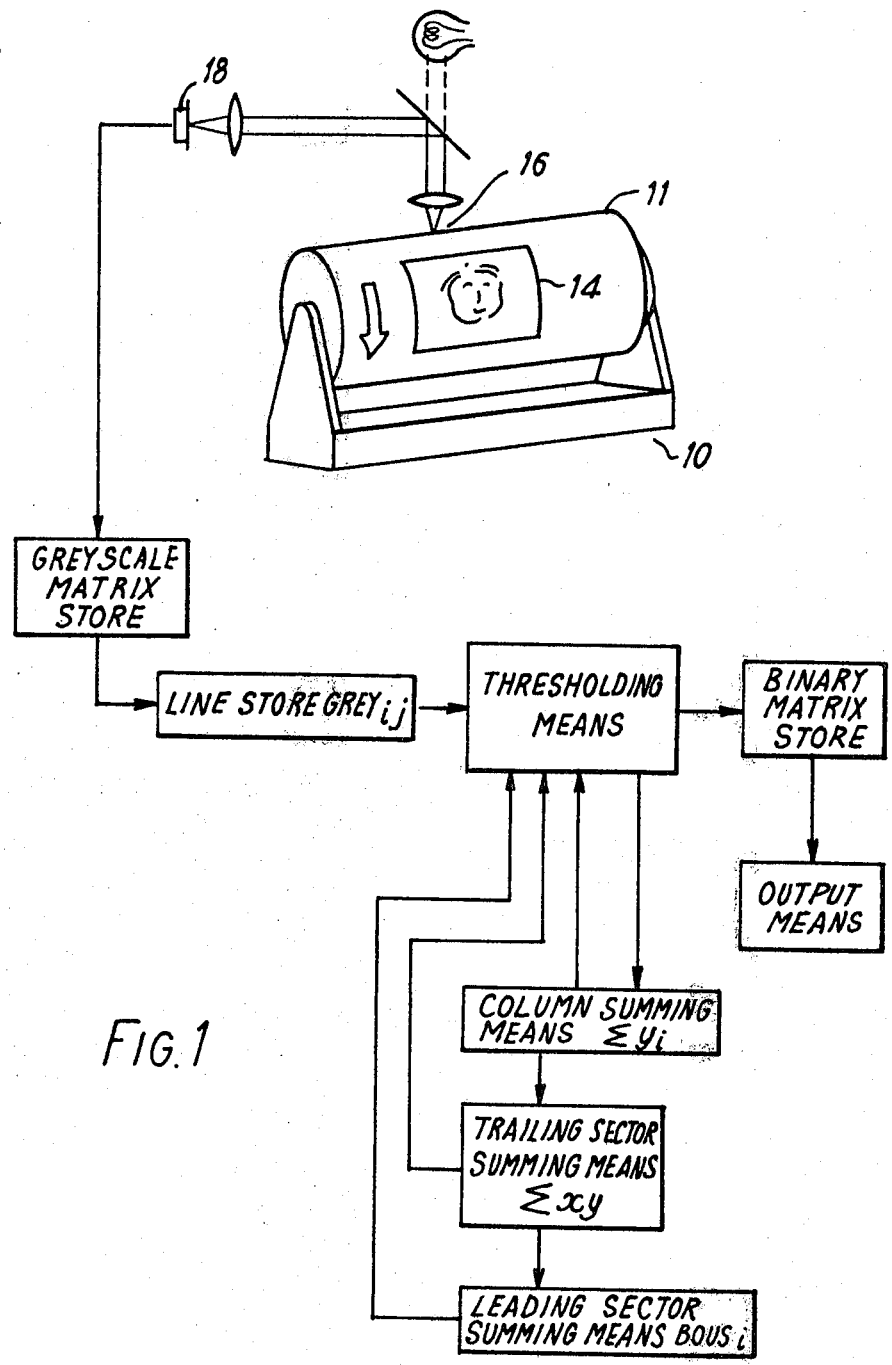
FIG. 1 shows largely in block diagram form apparatus according to this invention.
Figure 2:
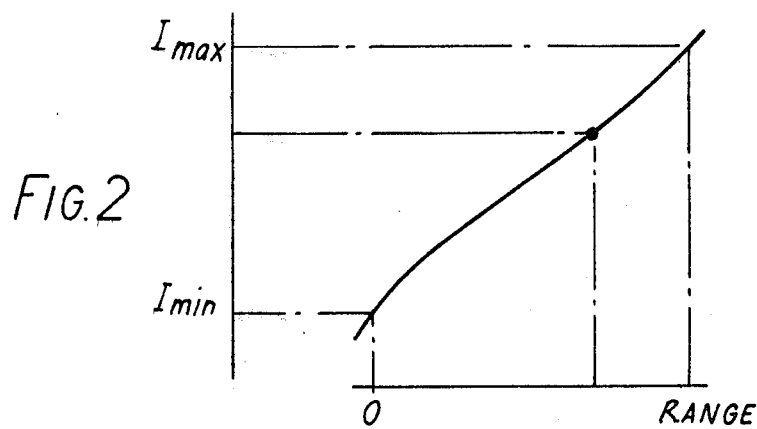
FIG. 2 illustrates graphically the correction process applied to the greyscale values of the original continuous tone picture.

Referring to FIG. 1, a scanner 10 consists of a rotating drum 11 on which is held a continuous tone picture such as a photograph 14. As the drum rotates, a focussed light spot 16 gradually scans the picture area line by line so that light gathered by a photodetector 18, received by transmission or reflection from the focal spot 16, is converted into a matrix of raster scanned greyscale picture element values of the picture. The values of optical density are detected within limits which are normally less than the least tone difference discernable by the eye. For convenience the scanned values $I_{max}$ and $I_{min}$ may be scaled to lie within a predefined range of values O-RANGE and masked non-linearly according to the reproduction process to compensate or correct for non-liner characteristics of the original picture or output process, this scaling being illustrated graphically in FIG. 2. Correction of this sort is normal practice when preparing printing screens from a photographic original. Additional correction is required when using dot matrix printers to compensate for the non-linearity introduced by dot overlap. A predefined look-up table is a convenient way of generating corrected picture element greyscle values corresponding to the scan greyscale values from the original continuous tone picture.

Alternatively, the greyscale picture element values may be acquired by scanning the continuous tone picture in devices such as a flying spot scanner, or electron beam scanner or from a sonar or radar scanning system or, in another instance, an X-ray body scanner: the picture may also be generated in a computer. The corrected greyscale values are then processed in the processing means illustrated in block diagram form in FIG. 1 and described hereinafter, to produce a binary matrix of "print" or "not print" values. The dispersed dot half tone picture is then reproduced in the output device 15—which may be an electrostatic printer plotter or an ink jet printer—by assigning print dots of a fixed size to the picture elements in accordance with the print values. Conventional gravure, lithographic or screen printing using fixed-sized ink dots may also be used.

Figure 3:
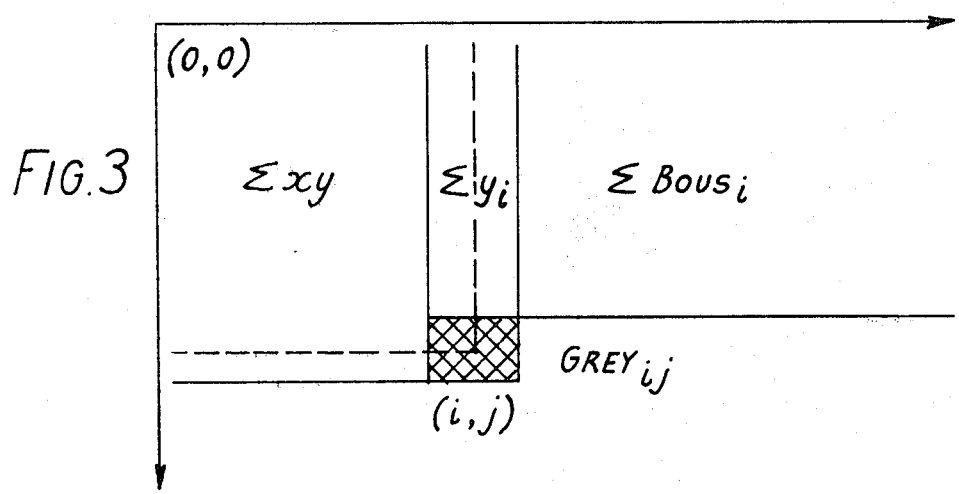
FIG. 3 illustrates graphically the contribution to the cumulative weighted sum of errors at a picture element (i,j), from various sectors of the picture elements already processed.

In FIG. 3 the principal parameters in the processing step are illustrated. The co-ordinates of each point in the picture are designated (i,j)—horizontally and vertically respectively—and at each point the corrected picture element greyscale value is $Grey_{ij}$. The paramters $\Sigma y_i$, $\Sigma xy$ and $\Sigma Bous_i$ are cumulative weighted sums of the errors between the original greyscale picture and the output half tone picture at the point (i,j) in the sectors illustrated which are calculated and used as described below. These parameters may be expressed either as continuous variables (i.e. analogue) or binary numbers (i.e. digitally). As shown in FIG. 1 three line storage registers are required, the capacity of each of these being equal to the number of points i across the picture. Two line storage registers are required for $\Sigma y_i$ and $\Sigma Bous_i$ and a further one for $Grey_{ij}$. A single register is required for $\Sigma xy$. The picture elements are processed sequentially along successive lines of the greyscale matrix with alternate lines being reversed in the $Grey_{ij}$ line storage register so that alterate lines are effectively processed in opposite senses. At each picture element the following general transform algorithm is applied:

1. IF $(\Sigma xy + \Sigma y_i + \Sigma Bous_i + Grey_{ij}) > T$ then $Print_{ij}$ = Black
   else $Print_{ij}$ = White 2. $\Sigma y_i := f \cdot (\Sigma y_i + Grey_{ij} - Print_{ij})$ 3. $\Sigma Bous_i := f \cdot \Sigma xy$ 4. $\Sigma xy := \Sigma xy + \Sigma y_i$ The steps numbered 1 to 4 are performed respectively by the threshold means; column summing means; leading sector summing means and trailing sector summing means shown in FIG. 1.

The four steps will be described in turn. In the notation employed, ":=" means "becomes" and is regarded as an update process.

Line 1 represents the threshold decision at the picture element (i,j) being processed. The local greyscale value $Grey_{ij}$, together with terms representing the cumulative weighted sums of errors from picture elements already processed, are compared with the threshold T. If the cumulative errors together with the new greyscale value exceeds the threshold, a fixed-size dot of value Black is printed, else the value White is added. Printing is therefore a bi-level print decision based on information localised at (i,j).

In line 2, $\Sigma y_i$ is a weighted sum of the errors between the greyscale value and binary print value at each of the picture elements already processed in the i'th column. The parameter f is a waiting or decay factor lying in the range $0 < f < 1$. Specifically, if we define $e_{ij} = Grey_{ij} - Print_{ij}$ then $$\Sigma y_i = \sum_{n=1} f^n e_{i,j-n} = f e_{i,j-1} + f^2 e_{i,j-2} + f^3 e_{i,j-3} + \ldots$$

The procedure in Line 2 adds into the current column error $\Sigma y_i$ the error at the new point $e_{ij}$ and multiplies the new cumulative weighted column error $(\Sigma y_i + e_{ij})$ by the decay factor f. This yields the weighted column sum which will be used in the processing of print element (i, J+1) in the next scan line. Thus Line 2 is a recursive relationship for updating the cumulative weighted column error $\Sigma y$.

It will be convenient to defer discussion of Line 3 until after Line 4 has been explained.

$\Sigma xy$ is a weighted sum of the column sums $\Sigma y_i$ in the 90° sector trailing the picture element (i,j). It can be written as $$\Sigma xy = \sum_{m=1} f^{m-1} \Sigma y_{i-m} = \Sigma y_{i-1} + f \Sigma y_{i-2} + f^2 \Sigma y_{i-3} + $$

where $\Sigma y_i$ is now the value updated in Line 2. The procedure in Line 4 multiplies the cumulative weighted trailing sector error $\Sigma xy$ by the decay factor f and adds the updated $\Sigma y_i$, which is the new column sum in column i updated in Line 2. It follows from the sum $$\sum_{m=1} f^{m-1} \Sigma y_{i-m+1} = \Sigma y_i + f \Sigma y_{i-1} + f^2 \Sigma y_{i-2} + $$

that line 4 is a recursive relationship to update the trailing sector sum $\Sigma xy$ for use in the processing of the subsequent decision point (i+1, j) in the scan direction.

Line 3 is a similar relationship to obtain $\Sigma Bous_i$ which is the weighted leading sector sum of column sums for columns in the 90° sector leading the picture element (i,j). It must be remembered that successive lines are processed in opposite senses, that is to say the processing is boustrophedon. The relationship in Line 3 merely recognises that the trailing sector sum used in processing the print element (i,j) is, when multiplied by the weighting factor f, the leading sector sum which will be required when processing— in the opposite scan direction—the corresponding print element (i,j+1) in the next line. The value of f. $\Sigma xy$ is stored in the i'th location of the $\Sigma Bous$ line register until it is required, this being done before $\Sigma xy$ is updated.

The sum of the terms $\Sigma xy + \Sigma y_i + \Sigma Bous_i$ is therefore the cumulative weighted sum of the errors of the 180° sector of the previously scanned picture relative to the picture element (i,j) being processed. Physically each component of the sum can be regarded as a decay weighted integral of the errors in the sector.

Figure 4:
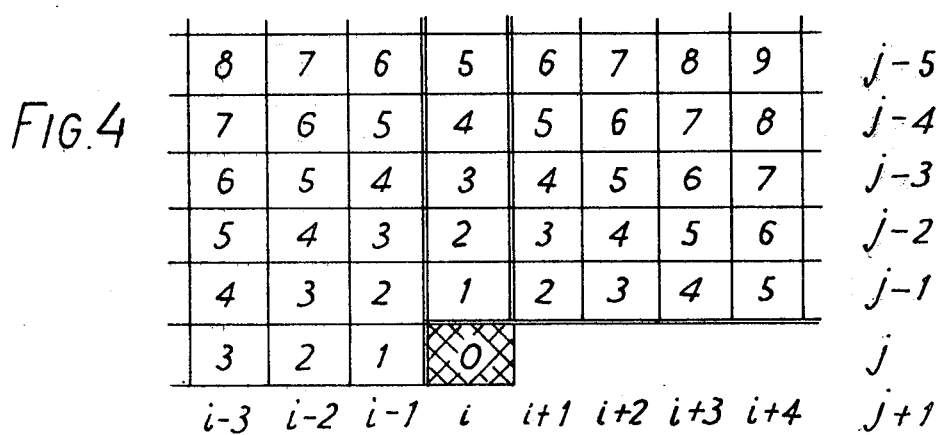
FIG. 4 shows in tabular form the equivalent weighting factors in powers of f in the cumulative weighted sum relative to the picture element (i,j) being processed.
Figure 5:
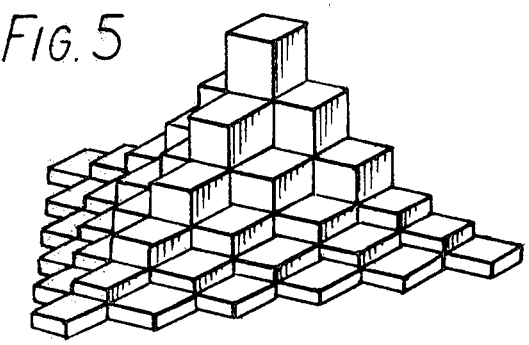
FIG. 5 illustrates diagrammatically the weighting factors of FIG. 4.

We can write $$\Sigma xy = \sum_{m=1} \sum_{n=1} f^{m+n} e_{i-m, j-n}$$

and thus the use of the factor f is equivalent to employing weighting factors which are the integral powers (m+n) of f given in FIG. 4. A more general case also exists when the dot matrix of the picture is rectangular as opposed to square. In this case it may be preferable to use unequal weighting factors $f_i$ and $f_j$. The table of weighting factors in this case is not limited to integral powers of f, but could take values such as (m+n·r), where r is the ratio of the sides of the matrix.

In the prior art, the influence of the errors from picture elements already processed is, as explained, calculated by repeatedly forming the product and then summing a set of products of adjacent errors and the corresponding weighting factors given by terms in the chosen (p×q) error matrix. In such a procedure, for each picture element p×q multiplications and summations have to be carried out; furthermore, q lines of error values have to be held and up-dated. In the preferred method according to the present invention, the column sums and the trailing and leading sector sums are produced by simple recursive relationships; only three up-date values are required for each picture element and only two lines of storage for error values are needed. In a slight modification, the trailing sector sum can be arranged to include the column containing the picture element being processed. One addition (that of $\Sigma y_i$) is thus saved in the thresholding decision. In this modification the up-dating relationships and the thresholding decision are as follows:

1. IF $(\Sigma xy_i + \Sigma \text{Bous}_i + \text{Grey}_{ij}) > T$
    then $\text{Print}_{ij} >$ Black
    else $\text{Print}_{ij} \rightleftharpoons$ White
2. $\Sigma y_i = f(\Sigma y_i + \text{Grey}_{ij} - \text{Print}_{ij})$
3. $\Sigma xy: = f \cdot \Sigma xy \Sigma + y_i$
4. $\Sigma \text{Bous}_i := f \cdot \Sigma xy$ Processing the picture elements boustrophedon is preferred, even though a further line store is then required for $\text{Grey}_{ij}$, because this conveniently generates leading as well as trailing sector error sums. This symmetrical pattern of error weighting is found to be beneficial in terms of the fidelity of reproduction, particularly when using detail enhancement as described hereinafter. If boustrophedon processing is not possible, where for example the input data is provided in successive scans from left to right only, in the manner of a television raster scan, a further modification can be made. In this modification the thresholding decisions are made in a scan from left to right in synchronism with the input data but the leading sector sum $\Sigma$Bous is up-dated during the fly-back period. The thresholding decision and the up-dating relationships are then as follows:

Scan left to right
1. IF $(\Sigma xy_i + \Sigma \text{Bous}_i + \text{Grey}_{ij}) > T$
    then $\text{Print}_{ij}=$ Black
    else $\text{Print}_{ij}=$ White
2. $\Sigma y_i := f \cdot (\Sigma y_i + \text{Grey}_{ij} - \text{Print}_{ij})$
3. $\Sigma xy: = f \cdot \Sigma xy + \Sigma y_i$ Scan right to left
4. $\Sigma xy: = f \Sigma xy + \Sigma y_i$
5. $\Sigma \text{Bous}: = \Sigma xy$ The store which is used to hold $\Sigma xy$ during the fly-back period when the successive values of $\Sigma$ Bous are being generated can be the same as the original $\Sigma xy$ store, or a separate store can be employed.

The thresholding procedure described in various forms above, which incorporates the cumulative weighted errors from the previously scanned picture, is primarily intended to distribute the correct number of dots on average in the output picture. It responds only gradually to high spatial frequency or small step changes in $\text{Grey}_{ij}$ in regions of the original picture. It is found that the picture quality is substantially improved by the inclusion of facilities for detail enhancement as now described.

Figure 6A:
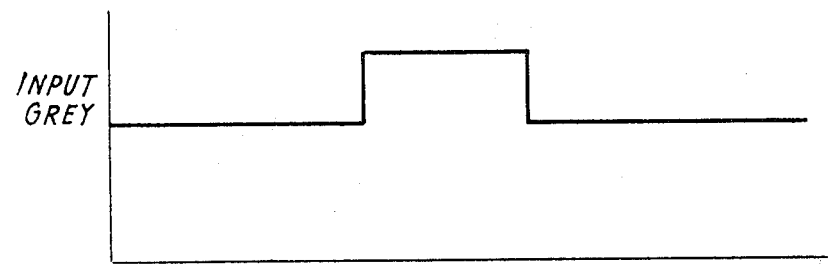
FIGS. 6a, 6b and 6c illustrate the effect of a detail enhancement factor m in the region of a step change of intensity in the picture
Figure 6B:
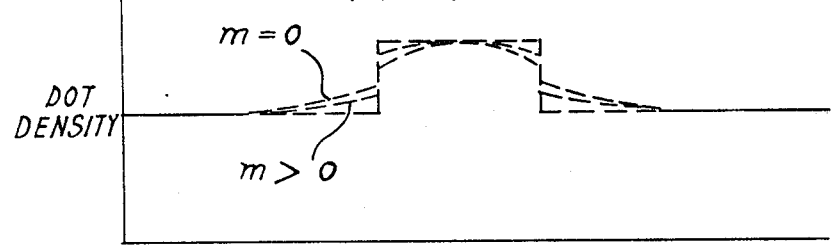

During operation of the apparatus and method described above, the terms $\Sigma xy + \Sigma y + \Sigma$ Bous represent a cumulative weighted sum of errors in the previous picture. For areas of level grey in the original picture they tend to a characteristic value: if the level of grey changes it takes several cycles, whether in the i or j directions, to alter the summations to the new values. This problem is illustrated in FIG. 6. In the absence of detail enhancement, error weighting both behind and ahead of the decision point smooth the response of the generated output shown in FIG. $6_B$, relative to the input grey shown in FIG. $6_A$. The resulting local dot density can be enhanced by use of the following modified thresholding decision and updating relationships.

1. IF $(\Sigma xy_i + \Sigma y_i + \Sigma \text{Bous}_i + \text{Grey}_{ij}(1+M)) > T$ then
    $\text{Print}_{ij}=$ Black else $\text{Print}_{ij}=$ White $$2. \quad \Sigma y_i := f \cdot \left( \Sigma y_i + \text{Grey}_{ij} \left( 1 - \frac{M(1-f)^2}{2f} \right) - \text{Print}_{ij} \right)$$

3. $\Sigma \text{Bous}_i := f \cdot (\Sigma xy_i)$
4. $\Sigma xy: = f(\Sigma xy_i) + \Sigma y_i$ In Line 1, the term $\text{Grey}_{ij}(1+M)$ amplifies the influence of the continuous tone input at the picture element (i,j) by effectively adding a term proportional to $(\text{Grey}_{ij} - \bar{g})$ or the local greyscale gradient; $\bar{g}$ being a local average greyscale value. This can be understood as follows:

Supposing that a marginal grey g is added into all elements in the picture prior to the picture element being processed, then increments in the cumulative weighted error sum can be calculated:

$$\Sigma y_i = \Sigma f^n g = \frac{fg}{1-f}$$

$$\Sigma xy = \Sigma\Sigma f^{m+n} g = \frac{fg}{(1-f)^2}$$

$$\Sigma \text{Bous}_i = f \Sigma xy = \frac{f^2 g}{(1-f)^2}$$

$$\therefore \Sigma y_i + \Sigma xy + \Sigma \text{Bous}_i = \frac{2f}{(1-f)^2} g$$

This shows the weighting at the picture element (i,j) of a uniform grey over the picture elements already processed.

In Line 2 the recursive relationship used to up-date $\Sigma y_i$ contains the error term $e_{ij}$ diminished by the term $$\frac{(1-f)^2 M}{2f} \cdot \text{Grey}_{ij}.$$

In the areas of uniform grey ($\text{Grey}_{ij}=g$) this has the effect of reducing the cumulative weighted sum of the errors by $M \times g$. Now in Line 1, the local grey in the threshold sum is enhanced by $M \times \text{Grey}_{ij}$. In areas of uniform grey, where $\text{Grey}_{ij}=g$, these terms cancel and no effect occurs. But when $\text{Grey}_{ij} \neq g$, where the greyscale fluctuates, the difference $(\text{Grey}_{ij} - g)$ is multiplied by M and this enhances the fluctuation.

Figure 6C:
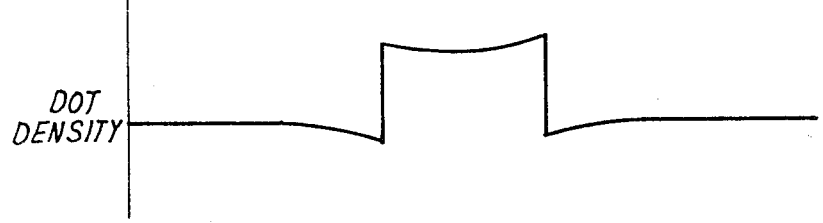

This method of edge enhancement introduces the influence of differences between the local grey and the average grey on the output print density without calculating and including values of the local average grey and this results in considerable economy in the processing step. By using increased values of M, edges in the output picture can be enhanced even relative to the input picture and this is sometimes desirable to improve the appearance or interpretation of the output picture, and also makes it possible to distinguish features which would normally be suppressed in the dot patterns of the dispersed half tone picture, as illustrated in FIG. 6c.

The modification introducing edge enhancement can of course be made to any of the examples described above. The weighting $$(1-f)^2/2f$$

applied to the detail enhancement factor M in the recursive relationship used to up-date $\Sigma y$ is of course a function of the chosen method for weighting the errors in the column sums$\Sigma y$ and in the sector sums$\Sigma xy$ and $\Sigma$ Bous. If different error weighting procedures are used, it will be a simple matter for the skilled man to calculate a fresh weighting factor for the detail enhancement factor M in the updating of $\Sigma y$ such that there is a cancellation of terms areas of uniform greyscale and an enhancement of any fluctuation from uniform greyscale.

In the embodiment described above, a constant threshold T has been assumed with a preferred value of (Black+White)/2 to ensure that the greyscale reproduction curve is symmetrical and—for values of f approaching 1—close to linear. A further modification will now be described in which varying threshold values $T_{ij}$ are employed.

It has been explained that dispersed dot half tone pictures obtained from the methods suggested in the prior art generally contain visual artefacts of the dot distribution which are not present in the original picture. In methods using dither threshold matrices, for example, the output picture generally shows repeating patterns at for example the matrix frequency, the form of these patterns depending on the local greyscale value. In methods employing error diffusion, print decisions in areas of level grey are generally made at regular intervals resulting in distinctive dot river patterns in the output picture. The methods described hereinbefore are not immune from this difficulty but it is found that a considerable improvement can be achieved if the constant threshold T is replaced by varying threshold values $T_{ij}$; this tending to break up the dot river patterns which are distinctive of ordered dither in the prior art.

In one modification of the present invention, random numbers are employed for $T_{ij}$ having a mean amplitude of the order (Black+White)/2, these random numbers being for example generated progressively for each threshold decision or being stored in an array of random values which can be repeated in a checker-board fashion over the matrix. The variation in threshold values required to break up the dot river patterns is not great and is in particular considerably less than the variation in threshold values employed in conventional ordered dither techniques in some of which the threshold values can vary over the entire greyscale range.

Even better results can be achieved by employing variable threshold values which are not random but which are carefully selected. In any array of threshold values, typically 8×8, there can be recognised variations in threshold values across or down the array having measurable frequencies and amplitudes. In addition, there will be differences in phase between any two frequency variations. It is found empirically first that there is more picture information to which the eye responds in the phase information that in the amplitude information. This means that patterns of phase are particularly distracting to the eye so that the phases should desirably be randomized. Second, it is found that certain amplitudes and frequencies lead to artefacts in the output picture which are distractions and should be avoided. Accordingly, it is possible to select an optimum array of threshold values by defining in the frequency plane the two dimensional amplitudes of the spatial frequencies or sequences in threshold variations which are known to result in the least distracting dot patterns, randomizing the phases of these variations and using an inverse Fourier or other transform to generate the corresponding array of threshold values. This technique is illustrated in FIGS. 7A and 7B where FIG. 7A shows the spectral amplitudes chosen empirically and FIG. 7B shows the resulting array of threshold values obtained by means of a Fourier transform using random phase. The array contains values whose average value is zero and the appropriate value of (Black+White)/2 must be added to these values to change it to the form of threshold array to be used in the thresholding decision.

Apparatus and methods according to this invention permit the ready reproduction of continuous tone pictures in half tone form on a variety of displays, printers or other output devices which can be characterised as bi-level, that is to say at each picture element there is either a dot of fixed-size or no dot at all. These bi-level devices are used widely to output computer generated graphics for example and the apparatus and methods according to this invention will accordingly find wide application. One example would be in the field of medical electronics where it is often necessary to provide quickly, and possibly with edge enhancement relative to the original, hard copies of the outputs of ultrasound scanners and nuclear imaging devices. A further example would be a case where a picture was required to be transmitted over a data link. If the apparatus and methods of the present invention are employed to reduce a continuous tone picture to a binary matrix, the transmission procedure will be greatly simplified since each picture element is then determined by a single bit rather than—in the case of a greyscale range of 0 to 64—six bits.

It should be understood that this invention has been described by way of examples only and a great variety of modifications can be made without departing from the scope of the invention. The feature of edge enhancement and the technique of using varying threshold values to supress dot artefacts are present in any preferred embodiment of this invention but are not to be regarded as essential. It should also be noted that the variable threshold value technique can be used to generate texture in the output of a picture, for example hatching or shading can be superimposed in selected areas of the output image.

In the arrangements described above, the cumulative weighted sum of errors is taken over all previously processed picture elements. That is to say the sector summing means provides a sum of all column sums. This is the preferred approach but in certain cases sector sums can be taken over selected column sums only.

Thus in one example the contribution of the columns leading the column containing the picture element being processed might be neglected. In a further example, a sector sum might be taken over sectors bounded by lines passing through the picture element being processed at 45° to the (i,j) directions respectively.

The use of a weighting factor whose exponent is proportional to the distance between the picture element being processed and, as appropriate the picture element or column associated with the error, is to be preferred although other methods of weighting are possible and will be apparent to the skilled man.

The invention has been described above in terms of single colour picture reproduction but since the reproduction curve is closely linear, dispersed dot half tone colour reproduction, preferably using subtractive inks, can be carried out in an analogous fashion using known techniques of preparing colour separations, generating dispersed dot half tones for each colourway including colour masking, colour compensation or undercolour correction by means of an equivalent form of the described Lines 1 to 4, and finally printing the resulting colours. Colour dispersed dot half tones displays can be similarly effected.

I claim:

1. Apparatus for generating a dispersed dot half tone picture from a continuous tone picture comprising means for formulating a greyscale matrix of picture element greyscale values representative of the continuous tone picture; processing means serving to produce through sequential processing of the picture elements along successive lines of the matrix an identically dimensioned binary matrix of picture element binary print values and output means providing a dispersed dot half tone picture by assigning fixed size print dots to the picture elements in accordance with the respective binary print values; characterised in that the processing means comprises column summing means for maintaining and updating for each matrix column a cumulative weighted sum of errors between the greyscale and binary values at picture elements already processed in that column, said errors being weighted in accordance with the proximity of the associated picture element to the line containing the picture element being processed; sector summing means for providing at the picture element being processed a cumulative weighted sum of column sums with each column sum in the sector sum being weighted in accordance with the proximity of the associated column to the column containing the picture element being processed and threshold means for comparing the sum of the greyscale value at the picture element being processed and said sector sum of errors with a threshold value to determine the associated print value in the binary matrix.

2. Apparatus according to claim 1, characterized in that the column summing means and the sector summing means are adapted to provide the respective weighted column sums and weighted sector sum by means of recursive relationships.

3. Apparatus according to claim 1 or claim 2, characterized in that the column summing means is so adapted that the error between the greyscale and binary values at each picture element is weighted in the appropriate column sum by a factor whose exponent is proportional to the distance between that picture element and the line containing the picture element being processed and in that the sector summing means is so adapted that each column sum is weighted in the sector sum by a factor whose exponent is proportional to the distance between that column and the column containing the picture element being processed.

4. Apparatus according to claim 1, characterised in that the processing means is arranged to process successive matrix lines in opposite directions.

5. Apparatus according to claim 4, characterised in that the sector summing means comprises a trailing sector store holding an updated cumulative weighted sum of column sums for columns trailing the column containing the picture element being processed and a plurality of leading sector stores each holding for a respective column that historic value of the trailing sector sum which was provided during processing of the appropriate picture element in the line preceding the line containing the picture element being processed.

6. Apparatus according to claim 1, characterised in that the processing means is so arranged as to make after sequential processing of the picture elements of any one line in a first line scan to determine said associated print values, a second line scan in the opposite direction to update the cumulative weighted sector sum.

7. Apparatus according to claim 6, characterised in that the sector summing means comprises a trailing sector store holding an updated cumulative weighted sum of column sums for columns trailing the column containing the picture element being processed and a plurality of leading sector stores each holding for a respective column an updated weighted sum of column sums for columns leading said respective column, the traling sector store being updated during said first line scan and the leading sector stores during said second line scan.

8. Apparatus according to claim 1, characterized in that the column summing means includes means for generating a first correction term, being a multiple of the greyscale value, for use in calculating said cumulative weighted column sum and in that the threshold means includes means for generating a second correction term, being a multiple of the greyscale value, for use in determining the associated print value.

9. Apparatus according to claim 8, characterised in that said means for generating respectively a first and a second correction term each comprise a look-up table relating greyscale values to correction terms.

10. Apparatus according to claim 9, characterised in that said look-up tables are adapted such that the entries in the respective tables associated with the same actual greyscale value are related by a negative factor whereby in picture areas of uniform greyscale values said correction terms cancel and fluctuations from a uniform greyscale value are enhanced.

11. Apparatus according to claim 1, characterized in that the threshold means includes means for selecting a threshold value for the picture element being processed.

12. Apparatus according to claim 11, characterised in that said means for selecting a threshold value comprises a store holding an array of threshold values.

13. Apparatus according to claim 11 or claim 12, characterised in that the variation in said selected threshold values is small compared with the range of greyscale values.

14. A method of generating a dispersed dot half tone picture from a continuous tone picture comprising the steps of formulating a greyscale matrix of picture element greyscale values representative of the continuous tone picture, processing the picture elements sequentially along successive lines of the matrix to produce an identically dimensioned binary matrix of picture element binary print values and forming a dispersed dot half tone picture by assigning fixed size print dots to the picture elements in accordance with the respective binary print values; characterised in that the processing step comprises comparing at each picture element a sector sum of errors between the greyscale and binary values at picture elements already processed plus the greyscale value at that picture element, with a threshold value to determine the corresponding print value in the binary matrix; using the resulting error to update in a recursive manner a cumulative weighted column sum of errors between the greyscale and binary values over picture elements already processed in the column containing the picture element and producing in a recursive manner a new weighted sector sum from the cumulative weighted column sums.

15. A method according to claim 14, characterised in that said weighted sector sum includes separate trailing and leading sector sums over columns respectively trailing and leading the column containing the picture element being processed.

16. A method according to claim 15, characterised in that successive matrix lines are processed in opposite directions and in that each trailing sector sum is used to generate a leading sector sum for use in processing the appropriate picture element in the following matrix line.

17. A method according to claim 14, characterised in that in the comparison step a term is added to the greyscale value corresponding to the product of a detail enhancement factor and said greyscale value and that the updating of the associated column sum includes the subtraction of a term corresponding to the product of the detail enhancement factor appropriately weighted and said greyscale value, said weighting of the detail enhancement factor being such that in picture areas of uniform greyscale value said terms cancel and that a fluctuation from a uniform greyscale value is enhanced in said comparison by the detail enhancement factor.

* * * * *